United States Patent [19]

Thibadeau et al.

[11] Patent Number: 5,003,495
[45] Date of Patent: Mar. 26, 1991

[54] METHOD AND APPARATUS FOR SCANNING, STORING AND REPRODUCING ARTWORK

[75] Inventors: Robert H. Thibadeau; Donnell M. Heyse, both of Pittsburgh, Pa.

[73] Assignee: Visual Understanding Systems, Inc., Pittsburgh, Pa.

[21] Appl. No.: 78,231

[22] Filed: Jul. 27, 1987

[51] Int. Cl.⁵ ............................................. G06F 15/20
[52] U.S. Cl. .................................... 364/521; 340/723; 364/518
[58] Field of Search .............................. 364/518–521, 364/491; 382/43, 46, 4; 355/61, 79, 81, 14 R; 340/721, 723

[56] References Cited

U.S. PATENT DOCUMENTS

| | | | |
|---|---|---|---|
| 3,959,884 | 6/1976 | Jordan et al. | 382/4 |
| 4,425,037 | 1/1984 | Hershel et al. | 355/61 X |
| 4,487,498 | 12/1984 | Guderley | 355/61 X |
| 4,571,072 | 2/1986 | Bourbeau, Jr. et al. | 355/79 |
| 4,641,967 | 2/1987 | Pecen | 364/491 X |
| 4,759,076 | 7/1988 | Tanaka et al. | 382/46 |
| 4,764,974 | 8/1988 | Woods | 382/43 |
| 4,791,583 | 12/1988 | Colburn | 364/521 X |
| 4,888,713 | 12/1989 | Falk | 364/522 |

OTHER PUBLICATIONS

"Novel Method for the Analysis of Printed Circuit Images", by Jon R. Mandeville published in SPIE, vol. 54, Applications of Digital Image Processing VII (1984).

"The State of the Art in Printed Wiring Board Inspection", by Robert Thibadeau published in the Carnegie–Mellon University, The Robotics Institute Technical Report, Nov. 1984.

"Problems of Automatic Vectorization of Artwork", by Robert Thibadeau, Sep., 1986.

Primary Examiner—Gary V. Harkcom
Assistant Examiner—H. R. Herndon
Attorney, Agent, or Firm—Buchanan Ingersoll

[57] ABSTRACT

Methods and apparatus for scanning and vectorizing artwork in which a grid is applied to photoplot artwork. Preferably the grid is automatically created from the scanned image of the artwork using the centerline of each line and the center of each pad in the artwork. The methods and apparatus also determine the rotation or skew of the artwork and adjust the image to compensate for any skew that is found. Grid spacing is determined from frequency plots of the artwork which show the number of lines and points that appear in each row of pixels and in each column of pixels. Fourier analyses of the frequency plots give the grid spacing.

16 Claims, 4 Drawing Sheets

METHOD AND APPARATUS FOR SCANNING, STORING AND REPRODUCING ARTWORK

FIELD OF THE INVENTION

The invention relates to a method and apparatus for scanning and storing printed artwork such as wiring diagrams or circuit layouts for automatic entry into computer aided design systems.

DESCRIPTION OF THE PRIOR ART

A number of attempts have been made to scan printed wiring artwork or drawings of circuit layouts for automatic entry into computer aided design systems. The goal is to enable a large body of hand taped work and photoplot artwork to be readily integrated into modern computer aided design/computer aided engineering systems. An added benefit is that artwork can be simply drawn on paper and then automatically scanned for photoplotting. The process of scanning artwork and processing the scanned information is generally referred to as artwork vectorization because a rasterized camera image must be transformed into a series of photoplot or point-to-point draws and single point flashes of different shapes or apertures.

Several commercial machines are available which accomplish forms of artwork vectorization. One type of machine is model driven. Our system is of this class. A model driven system does not store and reproduce exactly what is seen, but rather constructs a model of the original drawing or artwork. The system is programmed to recognize various representations and categorize them into certain models. Various types of models have been created, they range from extremely simple to extremely complex. In the model driven image processing method, the system first scans the material and recovers the physical features of the scanned material. Then it reconstructs the physical layout from the features scanned and the model constraints. Finally, there is a manual editing process to adjust and correct as necessary.

Model driven systems currently available have several shortcomings. All models rely on the dimensional integrity and correctness of the original material. Defects including dimensional deteriorations and photoplotting defects are reproduced. The spatial resolution of the scanner must be very high in order to overcome measurement problems associated with image quantization. To be commercially practical any vectorization system must operate at a particular speed which depends upon the system. There is a trade off between pixel resolution and speed which has cost consequences. An important consideration in selecting a method is whether or not it can be implemented to operate at speeds required. Frequently, the speed/cost criteria make model driven proposals unfeasible for this particular application. We provide a method and apparatus in which relatively low resolution scans will provide highly accurate results. However, this method does not depend on any particular scanner design, and in fact our apparatus interfaces with a variety of different commercially available scanners.

Editing is a major problem with automatic vectorization. Image interpretation processes have been developed which can correctly account for anything that somebody places in a photoplot. This is particularly useful for hand taped photoplots which may contain inadvertent errors made by the author. Furthermore, with age and use photoplots become scratched, get dusty or incur other dimensional deterioration which will cause errors of vectorization which cannot in practice be avoided. It is, therefore, necessary to edit the results of automatic vectorization. Several theories of editing have been found. These theories share the views that (a) the editor must be or have access to a complete CAD/CAE system; and (b) the editor must have a provision for review. It is generally accepted that there is no aspect of an interpretation which can be guaranteed correct by an automatic vectorizer. Consequently, review by a person is important. On the other hand, if it is possible for the vectorizer to guarantee a particular feature, then a person need never look over the machine's decision with respect to that particular feature. The degree of editing required simply relates to the sophistication of the vectorizing process. All processes currently in operation require some editing. The goal has always been to minimize the editing required.

Once the artwork has been scanned and stored in memory it is sometimes necessary to revise that artwork. For example, a designer having created a circuit board wiring diagram may determine it is necessary to change or add components to that circuit. It is desirable to have a system in which these changes and additions can be done automatically or simply by identifying the particular points where lines must be drawn or removed and allow the computer to make the changes. In the event that the original artwork had deteriorated before scanning so as to lose its dimensional integrity, it may not be possible to automatically make changes. Furthermore, the present systems will not correct any dimensional errors which are in the original artwork when created by the author. Such errors may go unnoticed and be unimportant for the particular artwork design. However, when changes are made these errors could create problems.

It is, therefore, desirable to have a vectorizing system which maintains the dimensional integrity of the work. It is further desirable to have a vectorizing system which will recognize and correct dimensional irregularities. It is also desirable to have a vectorizing system which will enable automatic modification of artwork which has been scanned.

SUMMARY OF THE INVENTION

The present invention relates to a method and apparatus for scanning and vectorizing artwork in which the system creates a work having shapes which we call lines and pads as numerically controlled, photoplot instructions and a grid to which the photoplot artwork is applied. Consequently, all lines and pads are stored and referenced to the grid created by the system. It is not necessary to physically draw a grid on the artwork prior to scanning. The grid is automatically created using estimates of the centerline of each line and the center of each pad in the artwork.

Before the grid is extracted the rotation or skew of the artwork is determined. Then the image is adjusted to compensate for any skew that is found. Next, a frequency plot of the artwork is made which shows the number of lines and points that appear in each row and column of pixels. A Fourier analysis of the frequency plot for pixel rows gives the spacing for the y grid and a Fourier analysis of the frequency plot for pixel columns gives the spacing for the x grid. The Fourier analyses also reveal the grid offset into the source image.

We prefer to provide a menu driven system that allows the operator to select and modify the size of the grid. We further prefer to allow the operator to change the distance between horizontal grid lines and the distance between vertical grid lines. These two distances need not be the same.

Once the grid is selected our system will automatically apply that grid to the raster image presented by the scanner. We further prefer to provide a system which allows the operator to move the grid relative to the image.

Finally, we prefer to provide means for identifying certain features in scanned artwork and then conforming the image of those features according to certain rules before the image is plotted. For example, when the artwork is a printed circuit, one may want to detect pads by the holes in them, as in the case of hand-taped works, or to be circular or square in shape as in the case of old photoplots.

Other objects and advantages of the invention will become apparent as the following description of certain present preferred methods and embodiments of practicing the same proceeds.

DESCRIPTION OF THE PREFERRED EMBODIMENTS

An optical scanner translates artwork into a raster image which is comprised of a matrix of pixels. Different scanners may create matrices of different sizes, but all matrices will have rows and columns of pixels. After the scanner creates the raster image, we first estimate the center of each line and shape in the image. The center line of each line and center of each pad is computed using iterative thinning. When this technique is inapplicable, centers of polygonal estimates of shapes are used. We also extract the width of shapes by direct measurement. Lines, dots, closed polygons, width measures, intersections, line ends and direct shape measurements provide the data in the construction or reconstruction of the photoplot. Particulars in this information can then be used to automatically create a grid.

Before the grid can be extracted it is necessary to find the rotation or skew of the artwork. This is accomplished by forming a histogram of the angles of all the center lines and finding a single number which, when added to each angle, will provide an orthogonal collection with peaks at 0 and 90 degrees. We assume that any long lines which are near 0 or 90 degrees were intended to be 0 or 90 degrees and compute an average deviation from 0 or 90 thereby setting the center number. All physical features from the image are then corrected for the overall rotational error which creates an adjusted data set from which a grid can be reconstructed.

Figure 1:
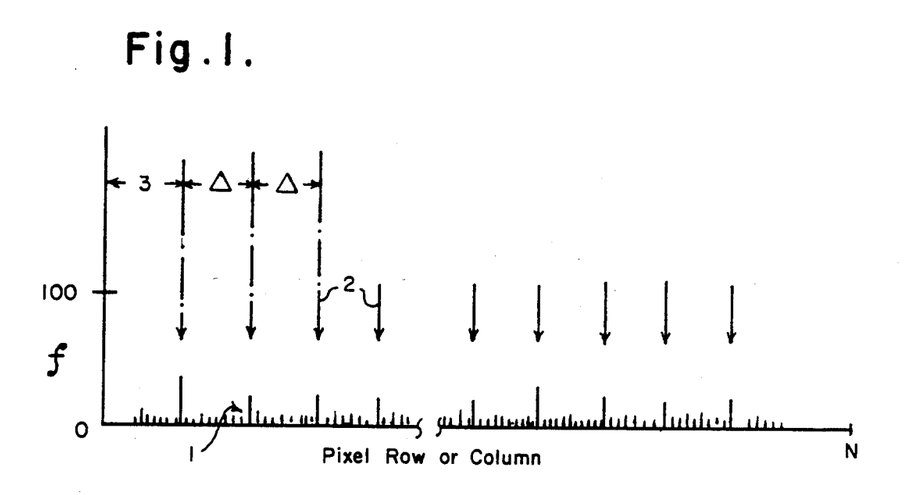
FIG. 1 is a histogram showing the frequency at which lines and points appear in a row or column of pixels, and the results of a Fourier analysis of that histogram.

We compute the grid by creating a frequency plot such as that shown in FIG. 1. The horizontal axis represents the rows or columns of pixels in the adjusted raster image. A common raster image has N rows and columns of pixels. Consequently, FIG. 1 indicates that there may be N data points along the horizontal axis. The vertical axis of FIG. 1 represents the number of pixels in each row or column of pixels which are used to create an image. That number will vary depending upon the artwork and can exceed 100. For convenience we show the horizontal axis of FIG. 1 to permit values up to 100. The frequency plot is created simply by counting pixels used in each row or column. Then we perform a Fourier analysis of the plot 1 which yields values indicated by the arrows 2. Those values should occur in a regular interval $\Delta$ which then is used as the spacing between grid lines of the grid we create. That spacing is identified as $\Delta x$ and $\Delta y$ in FIG. 2. It should be apparent that the spacing $\Delta x$ of vertical grid lines is derived from an analysis of columns of pixels. The spacing $\Delta y$ of horizontal grid lines is derived from an analysis of pixel rows.

Because the image normally does not appear in the first columns and rows of pixels, there will be an interval 3 between the vertical baseline and the first peak which we call offset. We calculate that offset from Fourier components and use it when we apply the grid to the artwork. The wave 1 goes to zero as it approaches N because there is typically no image in the last columns and rows of pixels.

Figure 2:
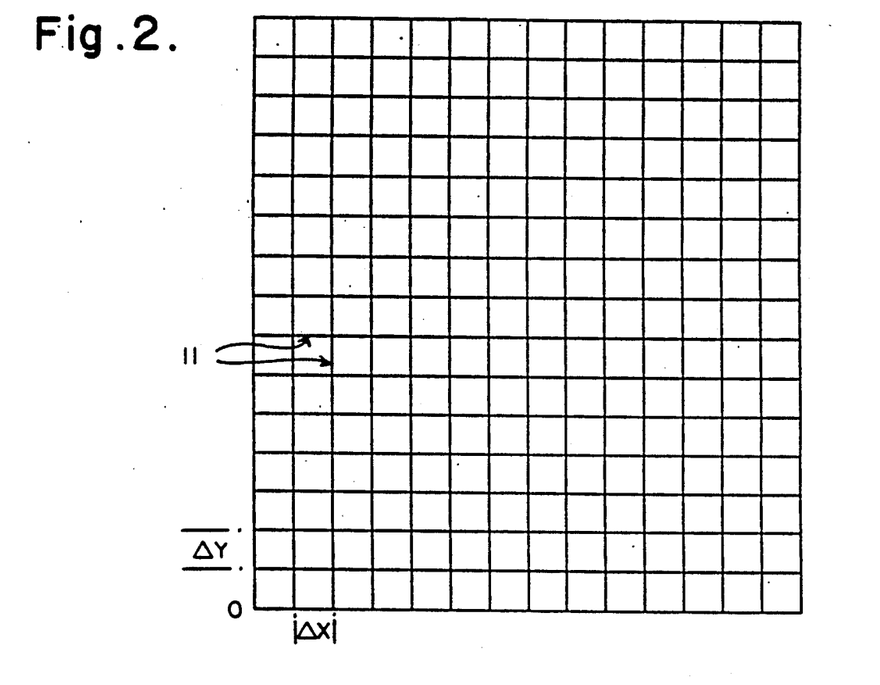
FIG. 2 is an (x,y) grid.

The analysis of the histograms of pixel rows and pixel columns will be a grid 11 such as is shown in FIG. 2. That grid has spacings $\Delta x$ and $\Delta y$ that correspond to the intervals from the Fourier analyses. $\Delta x$ and $\Delta y$ need not be the same, but for purposes of illustration are shown to be equal in FIG. 2.

Figure 3:
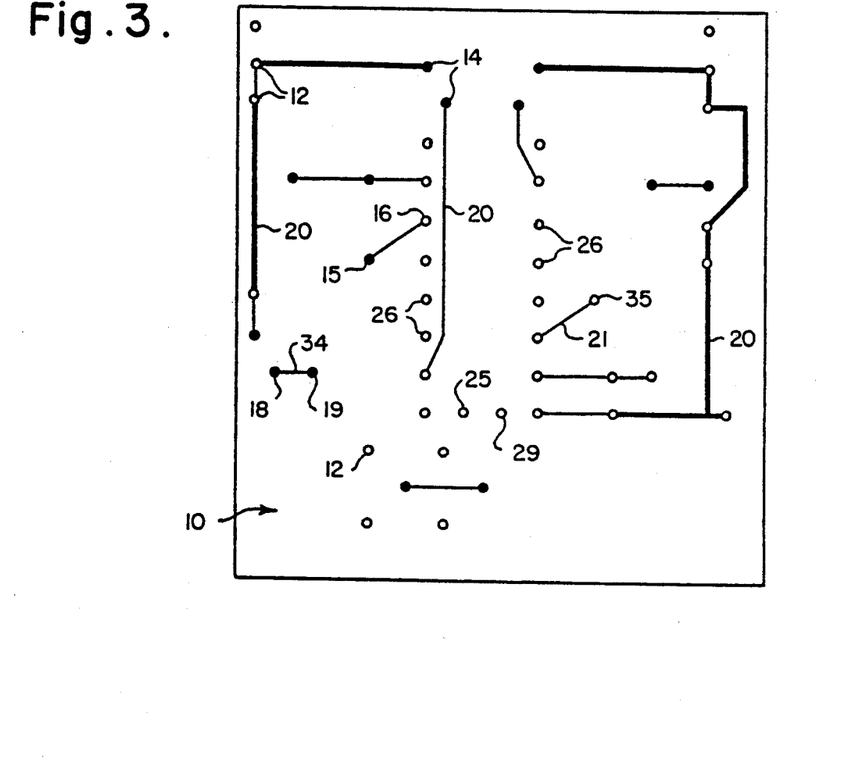
FIG. 3 is a plan view of a simple circuit.

In FIG. 3, we illustrate a simple circuit on board 10. The features drawn on board 10 can also be considered as the image of that circuit after being scanned. The circuit contains connection pads which may be large pads 12 or small pads 14 or any size in between. The pads may also be open as are large pads 12 and filled as are small pads 14. In addition, we have shown IC chip pins 26. At times, these pin pads are connected by lines 20 and 21 which as shown in the drawings may be thick, thin or any width in between. Hereinafter, we refer to the pads and lines as entities.

Figure 4:
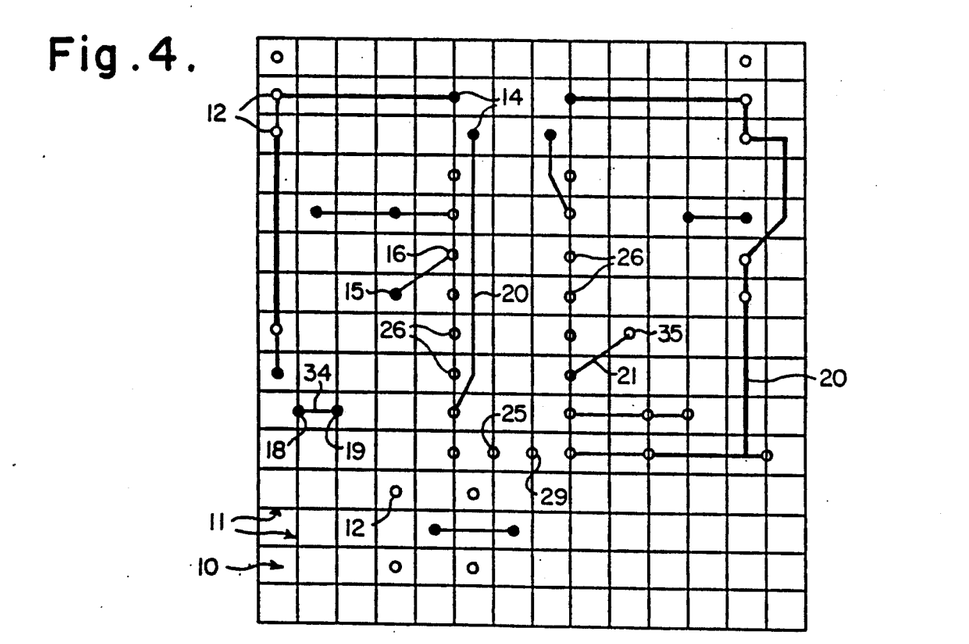
FIG. 4 is the circuit of FIG. 3 having the grid in FIG. 2 overlaid.

In FIG. 4, we illustrate the circuit of FIG. 3 having the grid 11 of FIG. 2 overlaid onto the circuit. In this feature the base lines of the grid correspond to the edges of board 10. It is now possible to identify the position of every entity by grid coordinates. However, such identification is more difficult if all pads and pins do not fall at an intersection of grid lines, and the lines do not either follow a grid line or extend between two points that are defined by intersections of grid lines. It is, therefore, desirable to first create a grid which enables as many entities as possible to fall on the grid intersections and lines. In FIG. 4, several pads and pins 26 do not fall on grid line intersections. Some lines 20 and 21 either do not follow a grid line, or extend between grid line intersections or both. We provide at least four ways in which the system or operator may adjust the grid to avoid these problems. One can move the grid relative to the circuit, change the grid spacings $\Delta x$, and $\Delta y$, and rotate the circuit relative to the grid or change the circuit. Any or all of these techniques can be used for a given circuit.

However, in many cases, after movement of the grid, rotation of the circuit and a change in grid line spacing, there will still be at least some entities that do not fall on the grid. We then provide a scheme to move entities (pads, lines and pins) which do not fall on the grid. We prefer to move those entities not on the grid to the grid if they fall within a specified distance from a grid line. This distance can be either predetermined and programmed for application to all work or it can be defined by the operator each time a work is scanned. We call this process of moving entities to a grid "snapping".

Figure 5:
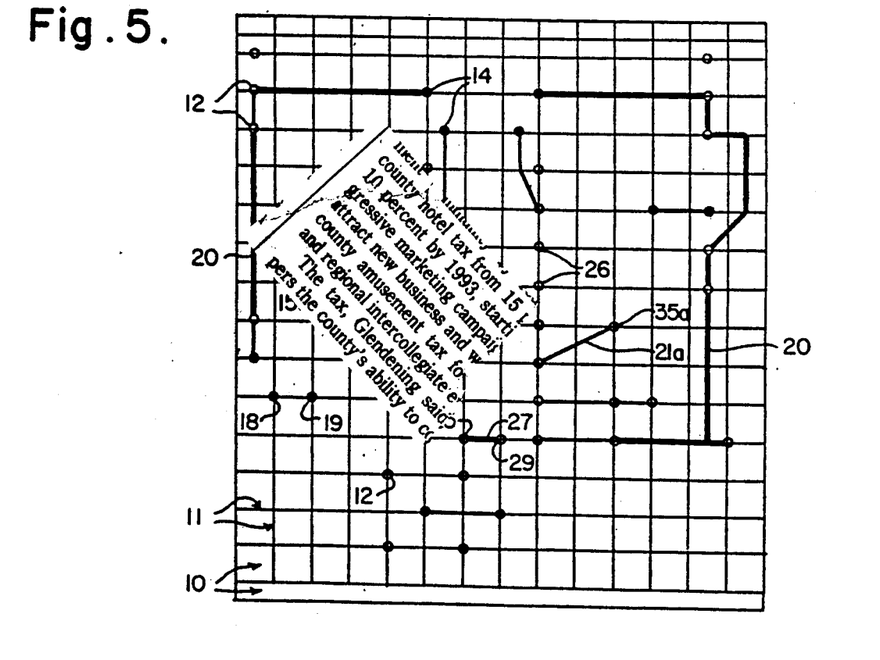
FIG. 5 is the circuit of FIGS. 3 and 4 after modifications have been made in accordance with our invention.

FIG. 5 illustrates the circuit of FIG. 4 after the grid 11 has been moved vertically and entities have been snapped onto the grid. Pad 15 and pin 16 and their connecting line in FIG. 4 were snapped to the grid in FIG. 5 as connected pad 15a and pin 16a. The ends of lines where no pad is present or where the pad has a hole in it can be extended to meet the grid. Line 21 in FIG. 4 was extended as line 21a in FIG. 5 because pad 35 to which line 21 is connected was snapped to the grid as pad 35a. Because the thick vertical lines were not within the predetermined distance from a grid line, they were not moved. We prefer to provide for the straightening of intersections which are not at right angles as well as the straightening of all horizontal and vertical lines. Those lines that are adjacent to each other and have the same slope are combined. Extra short lines in any corners are removed and corners are squared. Finally, the lines are scaled in accordance with the alterations made to match them to the grid. This ensures the integrity of the image so that a dimensionally plausible stored version results.

We also prefer to provide for the ability to modify the vectorized image. If new entity is desired, the location is given of the desired pads or end points of the lines and the operator may draw the new entity. Similarly, if an entity is to be deleted, the operator will take care of it. For example, if a line is wanted to connect pad 25 and pad 29 in FIG. 4, the operator will draw line 27 in FIG. 5. Likewise, if line 34 between pads 18 and 19 in FIG. 4 is to be deleted, the operator will delete it with the result as in FIG. 5. No line appears between pads 18 and 19.

Although we have illustrated our method as it can be used for a photoplot, it should be distinctly understood that our method is not limited to photoplots and can be used for any type of artwork including hand-drawn works and hand-taped works.

In applying our method to actual artwork it is sometimes necessary to account for certain characteristics in the artwork or to obtain manual control over methods, such as grid reconstruction, which are otherwise automatic. After the artwork has been scanned and vectorized it may be desirable to store the vectorized artwork permanently or output it to a CAD/CAM system, plotter or other device. Consequently, we have developed menu driven software to provide the operator with these options.

Figure 6:
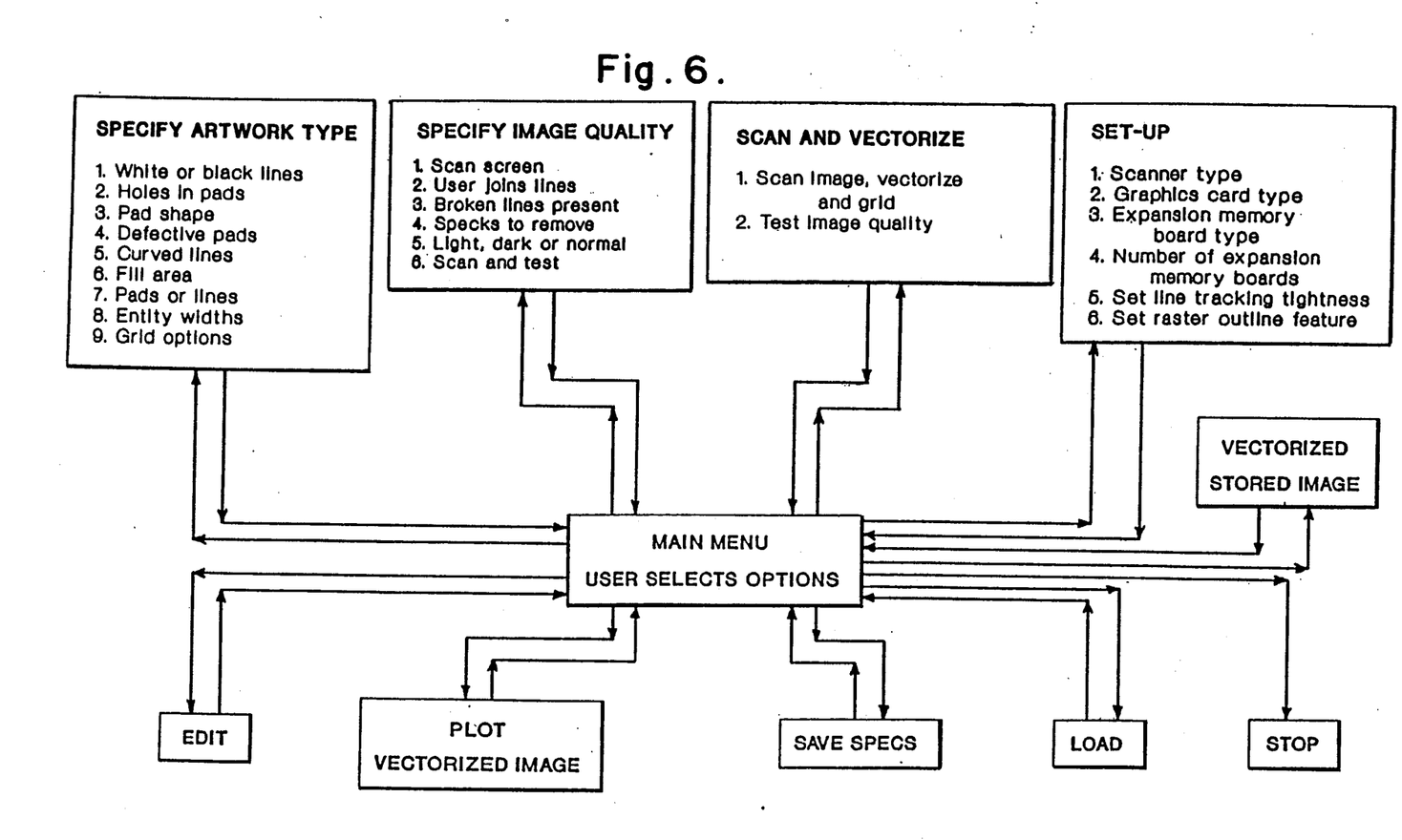
FIG. 6 is a flow diagram illustrating a present preferred embodiment of our methods.

In FIG. 6, we have illustrated a flow chart showing various choices the operator may make in utilizing a present preferred embodiment of our method. When the operator begins he is presented with a series of options represented by boxes 41 thru 51. As indicated by box 41, the operator must first select an option. After an option is selected the system will then implement the selection and return to the main menu 41 for a new selection unless the operator has chosen to stop 51. As shown in the drawing, some selections 42, 43, 44 and 45 will result in a new menu display enabling the operator to make further selections.

We prefer to provide the capability of allowing the operator to identify any unique characteristics that might exist in the artwork. This is programmed as a menu driven subsystem represented by box 42, SPECIFY ARTWORK TYPE. It permits the designation of white lines on black background as well as black lines on white background, the existence of holes in the pads, pad shape including the existence of square pads rather than or in addition to other shaped pads, notation of defective pads having cuts in them, the existence of curved lines in the artwork, any filled areas to be treated as filled polygons, whether or not pads are desired at the ends of lines, adjustment of entity widths on the artwork, and finally, certain grid options.

The width adjustment capability allows the operator to require the system to distinguish the widths of the various entities in the artwork. It provides the capability for allowing the operator to designate the number of line widths in the artwork, the width of the thickest line, the number of pad sizes, the minimum pad size, and whether or not any lines in the artwork have varying widths along their lengths. This permits the generation of a more realistic image. We prefer to measure the line widths and pad sizes in thousandths of an inch.

In generating the grid, which enables an exact duplication of the artwork, we provide the operator with the capability to adjust it manually and/or turn off the automatic grid reconstruction. An additional feature is manual control over grid snapping. When it is enabled, any pad or line that falls within a specified distance from the grid line will be "snapped" to the corresponding grid line; otherwise, it will be left alone. A further adjustment is a designation of the number of line channels between the pads. Another feature is that which permits the system to use the ends of the centerlines as well as the pads to find the grid. This enables the finding of the grid for hand-drawn work in which no pads are drawn but are implicit from line end points not connected to other line end points. Finally, the grid values automatically set up by the system can be checked against the original (raster) image. This is carried out during the vectorization process when the raster image can be overlaid by the grid on the screen and adjustments can be made in either or both of the x and y directions as well as adjusting (rotating) the image over the grid to correct any variations caused by the skewing that occurs when the artwork passes through the scanner. If the operator does not specify his choices, we prefer the system to employ a set of choices which enables the most automatic operation.

In specifying the artwork image quality represented by box 43, we prefer to provide the capability to allow the operator to adjust the vectorizer to enhance the image quality of the original artwork. This permits the generation of a quality vectorized output when a poor quality artwork or hand-drawn artwork is scanned. One feature of this subsystem provides the capability for the operator to scan to the screen in order to check the performance of the scanner and to view the scanned artwork as well as test its quality. Secondly, we provide for the prevention of poor vector formation and the joining of lines which are not to be joined by allowing the operator to identify any tiny holes in the image of the lines and pads. Furthermore, the capability is also provided to permit the operator to specify whether or not there are any finely broken lines in the artwork. It is also possible to set the system to remove any unwanted specks or marks from the image of the artwork. Another option that the operator can invoke in order to increase the quality of the vectorized output, is to set the scanner intensity to light, normal or dark. Finally, we provide the capability to scan the artwork and test any adjustments that have been specified within this or any other component. This is accomplished by panning the raster image that can be brought up on the screen.

In the third major component, box 44, we provide the instruction to scan and vectorize the artwork. The image is first scanned into memory enhanced as required by the settings in box 43, and vectorized as required by the settings in box 42. The three functions can be performed on the image whether it is stored in internal memory or permanent external memory. Furthermore, a copy of the original image, if needed for any purpose, is maintained in permanent external memory.

Another major capability that we provide, is the ability 45 to specify the hardware being used. This is presented in menu form and includes such things as scanner type, graphics card type and expansion memory board characteristics.

As previously mentioned, the capability to vectorize a disc stored file 46 is provided. The raster image is read from permanent memory and then used in the vectorization process. As mentioned above, this permits another artwork to be scanned while this disc stored image is vectorized. The vectorization that takes place is the same that occurs when the artwork is scanned into memory and vectorized directly from there.

We also provide the means 47 to edit the vectorized work in order to make changes and improvements.

The possibility of plotting 48 the results of the vectorization is also made available to the operator. Although one of the major reasons for the system is to provide an image processor whose generated data can be directly fed into a CAD/CAM database system, we prefer to provide the alternative of plotting by a hard copy device before the vectorization is entered into a CAD/CAM system. The availability of this choice is an advantageous feature of this system.

The operator may elect to save the specifications chosen for any type of artwork, load the specifications saved by name or stop. Those options are indicated by boxes 49, 50 and 51. By providing the option to save the specifications at any point in time, it permits all or a portion of the variables specified by the operator to be saved permanently in a file for future reference. The variables include those indicated in the indication of the quality of the artwork 42, specification of the image quality 43 and set-up 45. The system characteristics and modified image can either be saved or not. If it is indicated to load the configuration, then they are loaded into memory to prepare for processing. Note that the configurations can be both saved in permanent memory and loaded into internal memory for processing. In the case when the operator fails to indicate a choice for any option, the subsystem is programmed to supply a choice (default) for that option.

At later times, raster images often have to be compared with vectorized files. To accomplish this goal, we prefer to provide a raster image outline option. This option provides an outline of the artwork without having filled areas thereby decreasing the amount of data needed to represent the raster in a numerically controlled environment which decreases processing time. Our method is compatable with different types of editors. Thus, the operator may choose an editor that can take a large amount of photoplot data or use an editor that accepts less photoplot data and responds to the operator more rapidly.

Our method can be implemented through a vector image processing system which accepts artwork in any form and generates output that is processable by both CAD/CAM systems and hard copy devices. The process is carried out in three steps: raster form (bit-map) scanning of the artwork; conversion of the raster data (information) to vector data (information); and application of the grid translation of the resulting vectors into the appropriate CAD/CAM data or hard copy device data. This process permits the operator to reverse engineer the input into CAD/CAM usable format. Furthermore, the data (information) can be permanently stored or used to generate new versions of the original piece.

Figure 7:
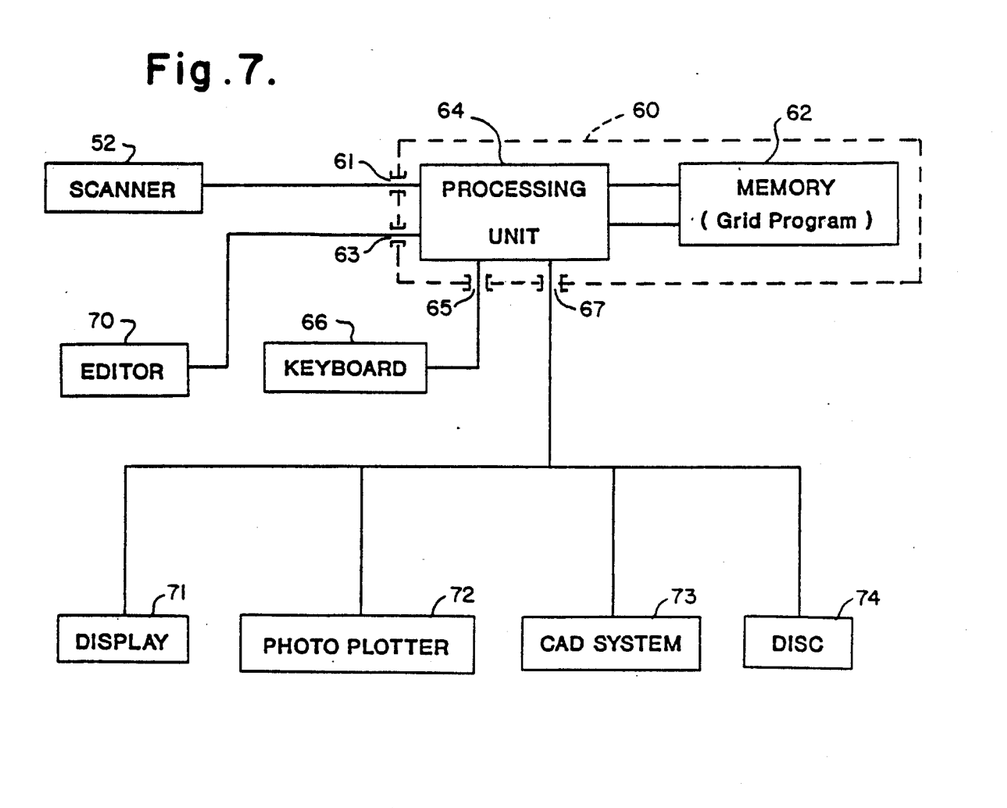
FIG. 7 is a block diagram illustrating a present preferred apparatus for employing our methods.

In FIG. 7, we show a block diagram of a preferred vector image processing system which employs our methods. This system can be made of several mandatory elements as well as some optional elements. The mandatory elements include a scanner 52 having a computer interface, a computer 60 and an editor 70. The computer is connected to the scanner and editor through ports 61 and 63. At least one other port 67 is provided for connecting the computer to data display and storage devices such as a display screen 71, photoplotter 72, CAD system 73 and disc drive 74. Generally, the computer consists of a memory 62 and processing unit 64. This could be in the form of a personal computer connected to a host computer and having a memory expansion board. In any event, the memory 62 must be sufficiently large to hold the image data from the scanner, a program which applies a grid to the image and data developed as a result of applying the grid to the image. Moreover, the program or a series of programs, in the memory preferably permits the various options shown in FIG. 6. Since our methods preferably are menu-driven, a keyboard 66 and display screen 71 are needed. However, it is possible to develop a system which automatically applies our methods to an image in a predetermined way. In that event operator interaction does not occur and a keyboard and display are not needed. Consequently, we show keyboard 66 connected to computer 60 through port 65.

Although we have described and illustrated certain present preferred embodiments of our method, it is to be distinctly understood that our invention is not limited thereto but may be variously embodied within the scope of the following claims.

We claim:

1. An improved method of vectorizing artwork onto a grid of the type wherein the artwork is scanned by an optical scanner which creates a numerical image of the work, then outputs the image into at least one of a memory, CAD system, a display and a photoplotter wherein the improvement comprises:
(a) translating the artwork with an optical scanner into a raster image comprised of a matrix of pixels,
(b) counting a number of pixels used in each row of pixels which are used to create the image of the artwork using a processing unit;
(c) creating with a processing unit a wave form representing the numbers of pixels used in all rows of pixels;

(d) performing a Fourier transform on the wave form;

(e) determining an interval from the Fourier transform;

(f) plotting a series of horizontal lines separated by the interval of step (e);

(g) counting a number of pixels in each column of pixels which are used to create the image using a processing unit;

(h) plotting each number obtained from step (g) to create a second wave form representing the number of pixels used in all columns of pixels;

(i) performing a second Fourier transform on the wave form;

(j) determining a second interval from the second Fourier transform; and (k) plotting with a processing unit a series of vertical lines separated by the second interval of step (j) with the horizontal lines of step (f) to form a grid; and (l) matching the grid to the image so that substantially all points, lines and other entities in the image will be on the grid.

2. The method of claim 1 also comprising the steps of identifying certain features in the artwork, scanning the image for those features and where necessary changing at least one of shape, dimension, darkness and position of those features in accordance with predetermined rules contained in the memory.

3. The method of claim 2 wherein the features identified are at least one of line color, line width, holes in pads, pad shape, defective pads, curved lines, fill areas and holes in pads.

4. The method of claim 2 wherein the features are adjusted in at least one of the following ways:
(a) all pads are given holes;
(b) all pads are conformed to a predetermined shape;
(c) curved lines are straightened;
(d) all fill areas are constructed as filled polygons;
(e) all lines have pads on their ends;
(f) all lines are predetermined widths;
(g) broken lines are joined
(h) specks are removed; and
(i) image darkness is changed.

5. The method of claim 1 also comprising the steps of identifying all entities which do not fall on one of a grid line and a grid intersection and then doing at least one of the following steps so that more entities will fall on one of a grid line and a grid intersection:
(a) modifying the grid to change distances between grid lines;
(b) rotating the grid relative to the image; and
(c) moving the grid in at least one of a vertical direction and a horizontal direction.

6. The method of claim 5 also comprising the step of displaying the image and grid on a screen after each step of modifying the grid, rotating the grid and moving the grid.

7. The method of claim 1 also comprising the steps of:
(a) identifying all entities which do not fall on one of a grid line and a grid intersection;
(b) determining if those entities are within a predetermined distance from at least one of a grid line and a grid intersection; and
(c) moving each entity which is within a predetermined distance of one of a grid line and a grid intersection to one of the grid line and the grid intersection.

8. The method of claim 1 also comprising the step of displaying the image and grid on a screen after moving all entities which are within a predetermined distance of one of a grid line and a grid intersection to one of the grid line and the grid intersection.

9. The method of claim 1 wherein the vertical lines are plotted before the horizontal lines are plotted.

10. The method of claim 1 wherein the horizontal lines are plotted before the vertical lines are plotted.

11. An improved apparatus for artwork vectorization comprising:
(a) an optical scanner which creates a raster image of scanned artwork comprised of a matrix of pixels, which image can be stored in a memory, displayed in a screen, used by a CAD system and photoplotted;
(b) a memory containing a first program for
  (i) counting a number of pixels used in each row of pixels which are used to create the image of the artwork using a processing unit;
  (ii) creating with a processing unit a wave form representing the numbers of pixels used in all rows of pixels;
  (iii) performing a Fourier transform on the wave form;
  (iv) determining an interval from the Fourier transform;
  (v) plotting a series of horizontal lines separated by the interval of step (e);
  (vi) counting a number of pixels in each column of pixels which are used to create the image using a processing unit;
  (vii) plotting each number obtained from step (g) to create a second wave form representing the number of pixels used in all columns of pixels;
  (viii) performing a second Fourier transform on the wave form;
  (ix) determining a second interval from the second Fourier transform;
  (x) plotting with a processing unit a series of vertical lines separated by the second interval of step (j) with the horizontal lines of step (f) to form a grid;
  (xi) matching the grid to the image so that substantially all points, lines and other entities in the image will be on the grid;
  (xii) the memory also having sufficient capacity to store the image from the optical scanner and the grid applied to the image by the program;
(c) a processing unit connected to the scanner and the memory; and
(d) an output means connected to the processing unit for transferring information from the scanner and from the memory to one of a display, a CAD system, a photoplotter and an external memory.

12. The apparatus of claim 11 also comprising a complete photoplot editor attached to the processing unit.

13. The apparatus of claim 11 also comprising a keyboard attached to the processing unit.

14. The apparatus of claim 11 also comprising at least one of a display, a photoplotter, a CAD system and a disc drive connected to the processing unit.

15. The apparatus of clam 11 wherein the memory also contains a program for doing at least one of:
(a) identifying features in the artwork;
(b) modifying features in an image of the artwork;
(c) modifying the grid to change distances between grid lines;

(d) rotating the grid relative to the image;
(e) moving the grid in at least one of a vertical direction and a horizontal direction;
(f) identifying the entities which do not fall on one of a grid line and a grid intersection;
(g) determining if those entities are within a predetermined distance from at least one of a grid line and a grid intersection; and (h) moving each entity which is within a predetermined distance of one of a grid line and a grid intersection to one of the grid line and the grid intersection.

16. The apparatus of claim 11 wherein the memory also contains a second program for modifying the image in accordance with predetermined rules to change at least one of shape, dimension, darkness and position of features of the image.

* * * * *

UNITED STATES PATENT AND TRADEMARK OFFICE
CERTIFICATE OF CORRECTION

PATENT NO. : 5,003,495

DATED : March 26, 1991

INVENTOR(S) : ROBERT H. THIBADEAU, DONNELL M. HEYSE

It is certified that error appears in the above-identified patent and that said Letters Patent is hereby corrected as shown below:

The sheet of drawing (3 of 5) consisting of Figures 3 and 5 should be deleted and substitute the sheet of drawing as shown on the the attached page.

Signed and Sealed this

Fifteenth Day of October, 1991

Attest:

HARRY F. MANBECK, JR.

*Attesting Officer*     *Commissioner of Patents and Trademarks*

Fig. 3.

Fig. 5.